(12) United States Patent
Waldrop

(10) Patent No.: US 6,378,349 B1
(45) Date of Patent: Apr. 30, 2002

(54) TOOL AND USE THEREOF FOR FORMING A SHEET METAL TUBE END

(76) Inventor: Billy B. Waldrop, #28 Tiffany Trace, Anniston, AL (US) 36206

(*) Notice: Subject to any disclaimer, the term of this patent is extended or adjusted under 35 U.S.C. 154(b) by 0 days.

(21) Appl. No.: 09/798,575

(22) Filed: Mar. 2, 2001

(51) Int. Cl.[7] .............................................. B21D 28/10
(52) U.S. Cl. ......................... 72/326; 72/370.11; 83/54; 29/897.3
(58) Field of Search ..................... 72/325, 324, 370.01, 72/370.03, 370.11, 370.1, 370.13, 326; 83/54; 29/897.3, 897.31

(56) References Cited

U.S. PATENT DOCUMENTS

| | | | |
|---|---|---|---|
| 1,595,564 A | * 8/1926 | Neuhaus | 72/370.11 |
| 2,658,241 A | 11/1953 | Houghton, Jr. et al. | |
| 2,711,806 A | 6/1955 | Smith | |
| 2,726,743 A | 12/1955 | Short et al. | |
| 2,841,634 A | 7/1958 | Kimball | |
| 3,020,636 A | * 2/1962 | Ayton et al. | 72/325 |
| 3,039,731 A | 6/1962 | Young | |
| 3,078,970 A | 2/1963 | Black | |
| 3,083,795 A | 4/1963 | Land | |
| 3,088,562 A | 5/1963 | Jones et al. | |
| 3,102,306 A | 9/1963 | Hutchinson | |
| 3,124,223 A | 3/1964 | Kisovec | |
| 3,196,996 A | 7/1965 | De Le Rambelje | |
| 3,247,639 A | 4/1966 | De La Rambelje | |
| 3,282,001 A | 11/1966 | Bigalow | |
| 3,325,957 A | 6/1967 | Demeules et al. | |
| 3,648,425 A | 3/1972 | Bolton | |
| 3,779,591 A | * 12/1973 | Rands | 188/375 |
| 3,897,668 A | 8/1975 | McDonnell | |
| 4,040,177 A | * 8/1977 | Beeler et al. | 72/326 |
| 4,364,406 A | * 12/1982 | Bohlin | 72/325 |
| 4,397,127 A | 8/1983 | Mieyal | |
| 4,433,949 A | * 2/1984 | Hallock | 72/325 |
| 4,974,436 A | * 12/1990 | Nakatsuji | 72/326 |
| 5,228,251 A | 7/1993 | Frigon | |

FOREIGN PATENT DOCUMENTS

| | | | |
|---|---|---|---|
| EP | 0625622 | 5/1994 | |
| GB | 768261 | * 2/1957 | 72/325 |
| SU | 1532135 | * 12/1989 | 72/325 |

* cited by examiner

Primary Examiner—Daniel C. Crane
(74) Attorney, Agent, or Firm—Gene Scott-Patent Law & Venture Group

(57) ABSTRACT

A sheet metal cutting and forming tool is used in preparing the ends of square sheet metal tubes used in building construction as framing struts and studs. The tool receives a tube end axially wherein four cutting edges sever the tube at its four corners. Two opposing curved surfaces force two corresponding opposing sides of the tubing to roll up inside the tube, while two alternate curved surfaces force the alternate corresponding opposing sides to move outwardly into slots or onto laterally oriented guide surfaces. The resultant tube end provides opposing and axially or laterally extending sides spaced apart for receiving a second tube of the same size wherein the alternate sides may be fastened to the second tube sidewall while the rolled-up ends provide great rigidity, or alternately the lateral tube ends are easily fastened to a wall or similar surface.

6 Claims, 7 Drawing Sheets

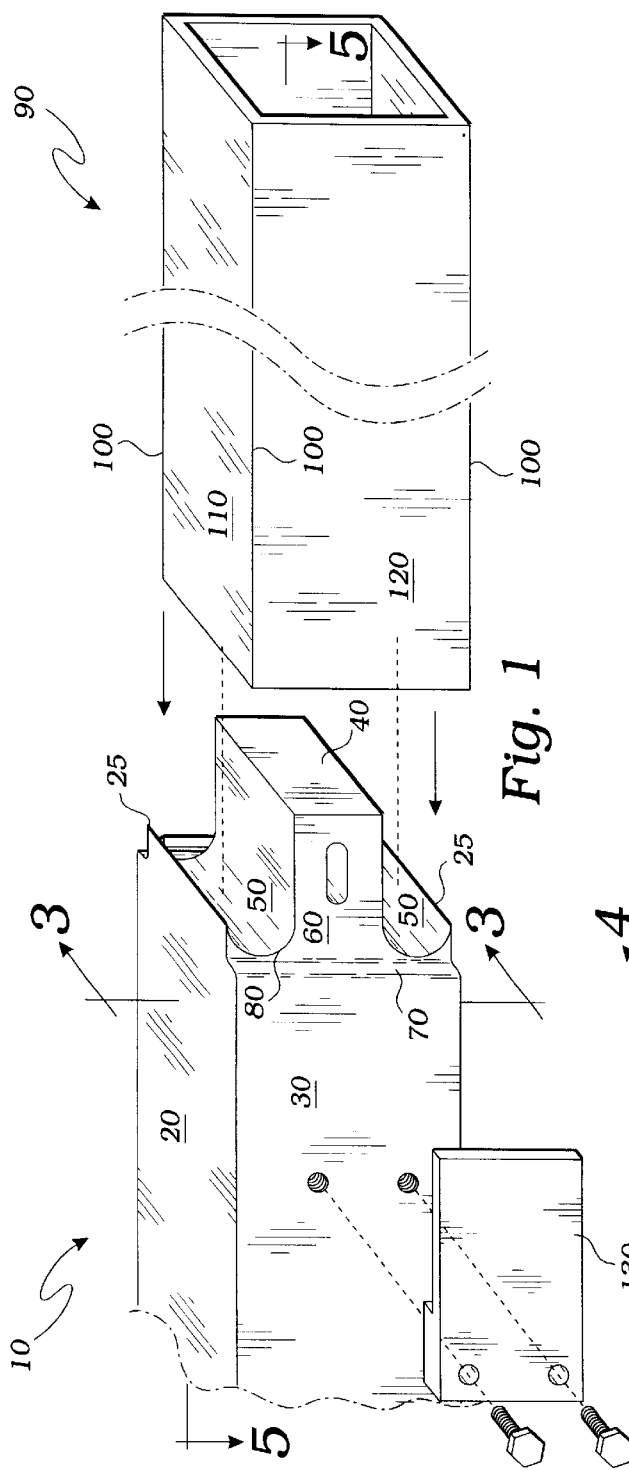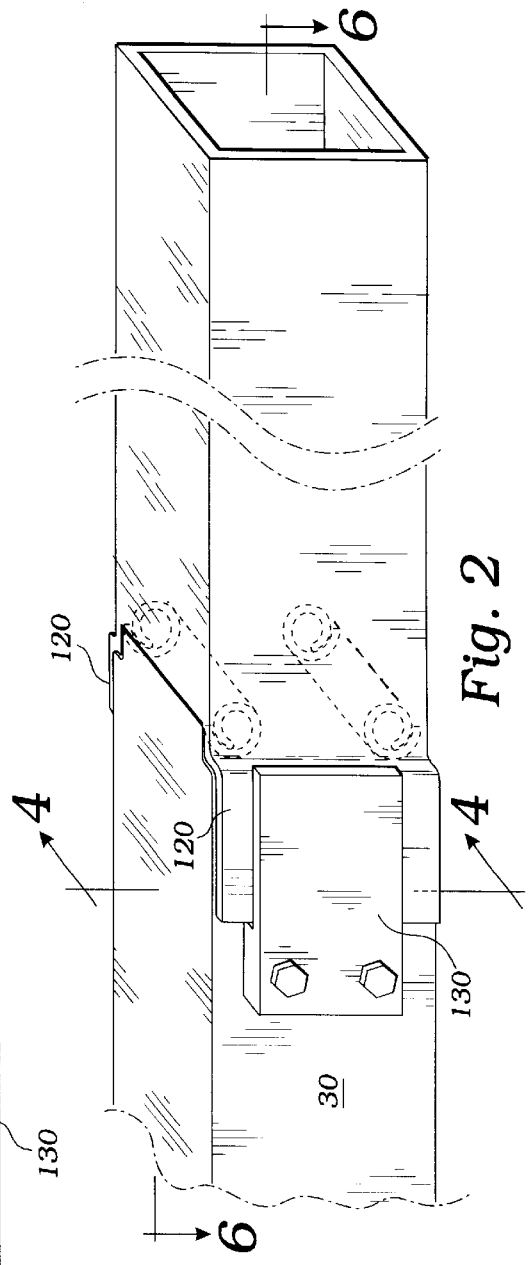

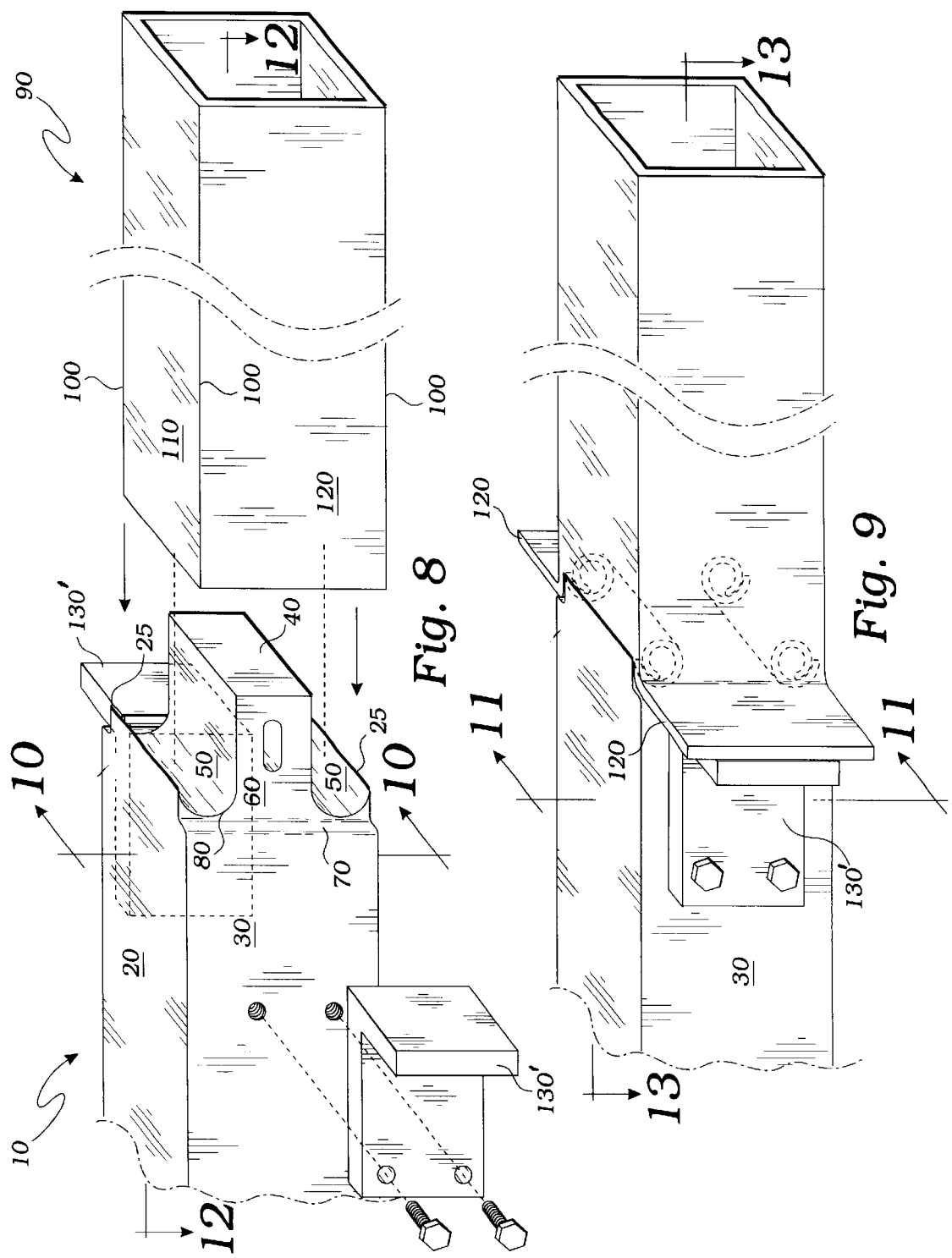

TOOL AND USE THEREOF FOR FORMING A SHEET METAL TUBE END

BACKGROUND OF THE INVENTION

1. Field of the Invention

This invention relates generally to a tool and its use in forming a tube end and more particularly to method with such a tool and its use for preparing the ends of square tubes used for metal framing in the construction industry.

2. Description of Related Art

The following art defines the present state of this field:

Houghton, Jr., et al., U.S. Pat. No. 2,658,241 describes a bridging unit comprising a pair of telescopically adjustable bars of substantially U-shaped cross-section. The female bar includes a longitudinal guide rib in its bight portion and further including longitudinally spaced, outwardly pressed substantially louver-shaped projections defining depressions in its opposed side walls spaced from the free longitudinal edges thereof. The female bar still further having channels in the side walls extending from the depressions to said longitudinal edges, substantially louver-shaped dogs struck out from the side walls of the male section and engageable selectively in and disengageable from the depressions through the channels for releaseably securing the bars in adjusted position. The male section having a longitudinal groove in its bight portions slidably accommodating the rib, and guides struck inwardly from the side walls of the female bar adjacent one end thereof and engaged with the longitudinal edges of the male bar for slidably securing same in the one end of the female bar.

Smith, U.S. Pat. No. 2,711,806 describes an expandable supporting beam for use in building, comprising a plurality of telescopic member including a central member and two end members, each end member having an opening adjacent the outermost end thereof, a bearing portion on each of the end members for respective mounting on spaced supports, means for removing the bearing portions from the supports and including dismounting bars, each bar being provided with a recess facing a corresponding opening; the bars being mounted for longitudinal sliding movement in the outer ends of the end members and movable between inoperative positions within the members and operative positions extending beyond the ends of the end members to abut the supports on which the members bear to force the respective bearing portions from the supports, and means extending through an opening in one of the end members into a recess in one of the bars for moving each of the dismounter bars between the positions.

Short et al., U.S. Pat. No. 2,726,743 describes a girder comprising a pair of open-web I-beams, means, at longitudinally spaced stations connecting adjacent flange edges of the beam in a manner to secure the beams in spaced parallel relationship defining a continuous passageway therebetween, bounded on its sides by the respective webs of the beams and on its top and bottom by the respective adjacent upper and lower flanges of said beams and said connecting means, said adjacent flanges at the bottom of the passageway defining a pair of spaced tracks there along, the adjacent parallel flanges at the top of the passageway defining a pair of tracks there along opposed to the lower tracks, a second pair of open-web I-beams of lesser height and width than said passageway in said first pair of I-beams, means securing the second pair of I-beams in parallel relationship at the adjacent corresponding edges of their upper and lower flanges, the second pair of I-beams being retractable and extensible in the passageway defined by said first pair of I-beams, opposed anti-friction roller means between the first and second pair of I-beams, engageable along the upper and lower pairs of tracks respectively for centering the second pair of I-beams within the first pair of I-beams, and for facilitating longitudinal telescoping movement of said first and second pairs of I-beams, the roller means comprising transverse bearing sleeves welded to the web of the second beam in alignment, and axle extending through said sleeves, and individual rollers on said axle outwardly of the web of the second pair of I-beams in engagement with the flange of the first pair of I-beams, and other of the individual rollers inwardly of the webs of the second pair of I-beams in engagement with the flanges of the second pair of I-beams.

Kimball, U.S. Pat. No. 2,841,634 describes a tubular pole that comprises a plurality of nonmetallic telescopic sections and with the sections of the pole being of substantially identical diameter for the major height of the pole, a metallic conductor embedded within each of the sections and with the conductors having outwardly and inwardly exposed portions whereby the conductors of adjacent sections have in overlying frictional contact when the sections are in telescoped relation to form a continuous electrical conductor throughout the height of the pole, the conductors lying wholly within the pole against external exposure when the sections are assembled.

Young, U.S. Pat. No. 3,039,731 describes an extensible column for supporting an overhead roof structure relative to a floor slab or the like comprising, a pair of load-bearing tubes each having a relatively thin cylindrical wall, cross members joining said tubes rigidly in spaced parallel relationship, an extensible stud having a relatively thin cylindrical wall telescopically interfitting an endwise portion of each load-bearing tube, each stud having a portion projecting outwardly beyond the end of said load-bearing tube, an endwise portion of the stud being flattened and providing an anchor plate projecting from the end portion of the stud at right angles to the axis thereof, the anchor plate being integral with the cylindrical wall of the stud, the anchor plate having fold portions integral with the end of the cylindrical wall of the stud and doubled over upon the anchor plate, the fold portions extending outwardly and joined to the outer edges of the anchor plate at opposite sides, the fold portion providing a rigid connection adapting the anchor plate to resist angular deflection relative to the stud, the end portion of each load-bearing tube opposite the stud having an anchor plate projecting therefrom at right angles to the axis of the load-bearing tube, the column adapted to be interfitted in upright position between the floor slab and roof structure with the studs extended and with the anchor plates seated against the floor slab and roof structure, and means for locking the extensible studs relative to the load-bearing tubes, thereby adapting the column to carry the weight load of the roof structure.

Black, U.S. Pat. No. 3,078,970 describes a section of a sectional adjustable truss-type bridge joist, a prefabricated section comprising, in combination, a linearly straight upper angle iron, a complemental linearly straight lower angle iron parallel to and spaced below the upper angle iron, the angle irons being of duplicate cross-section and each including a vertical flange and a horizontal flange, the vertical flanges being in a common plane, the corresponding inner ends of the upper and lower angle irons terminating together a flat-faced plate of a cross-sectional thickness corresponding to the thickness of the vertical flanges of the angle irons and interposed between and welded to the cooperative lengthwise edges of the flanges, and a vertical longitudinal edge of the plate being flush with the cooperating terminal ends of the vertical flanges, the vertical flanges having several bolt holes cooperating with the transverse end portions of the plate, the end of the upper angle iron opposite to the locale of the plate extending beyond the corresponding end of the lower angle iron and being provided with L-shaped fixedly attached cleats, the cleats providing bearing seats, and diagonal braces connecting the upper and lower angle irons together.

Land, U.S. Pat. No. 3,083,795 describes a building wall comprising first channel means secured to the building ceiling and having downwardly depending spaced apart substantially parallel flanges, second channel means secured to the building floor and having upwardly extending spaced apart substantially parallel flanges, the first channel means being disposed in cooperative relation to the second channel means, a plurality of tubular support elements interposed between the first and second channel means in horizontally spaced generally parallel relation, the ends of the support elements being disposed between the flanges of the first and second channel means, each support element comprising an elongated element into at least one end of which an extension element is mounted in axially adjustable threaded relation, an outer surface of each elongated element being in substantial alignment with the outer surface of one flange of the first channel means and with the outer surface of the corresponding flange of the second channel means, a spacer block threadedly mounted on at least one of the extension elements and normally disposed approximately midway between the one end of the associated elongated element and the associated channel means, the spacer block having an outer surface in substantial alignment with the outer aligned surfaces of the associated elongated element and flanges wall panel means disposed adjacent the vertically aligned surface of said spacer block, flanges, and tubular supports in flat abutting face contacting relation and means for securing the wall panel means to the adjacent aligned surfaces of the flanges, spacer block, and tubular supports.

Jones et al., U.S. Pat. No. 3,088,562 describes an extensible and contractible joist comprising an outer joist member and an inner joist member disposed in telescopic relationship to each other, the outer joist member comprising a top frame, a bottom frame and side frame members defining a hollow frame construction, the inner joist member having a top member, side members and terminating at its bottom in a lateral projection, the inner joist member being of a height less than the spacing between the top and bottom frames of the outer joist member, but the top frame of the outer joist member and the extended portion of the top member of the inner joist member defining a generally continuous unobstructed horizontal load bearing surface, overhanging projection means carried by the bottom frame of the outer joist member at an end thereof, the overhanging projection means overhanging the lateral projection of the inner joist member permitting slidable movement of the inner joist member relative to the outer joist member but restricting upward movement of the inner joist member within the outer joist member to space the top member of the inner joist member a short distance below the top frame of the outer joist member, and a plate carried by the bottom frame of the outer joist member adjacent the overhanging projection means restricting downward movement of the inner joist member within the outer joist member to maintain the top member of the inner joist member in substantially plane-parallel spaced relationship to the top frame of the outer joist member, thereby to cause the inner joist member in use to be loaded in tension at the juncture of the inner joist member with the end of the outer joist member and to prevent the application of crushing force from the outer joist member to the top frame member of the inner joist member.

Hutchinson, U.S. Pat. No. 3,102,306 describes a method of forming a pair of separably connected cooperating bracing members comprising cutting out a pair of transverse diametrically opposed slots from a long flat strip of metal intermediate the ends thereof and leaving a narrow tongue separating the slots, the slots communicating with the sides of the strip, the slots communicating with the sides of the strip, the slots dividing the strip into first and second end portions which are connected by the tongue, forming at least one opening in the first end portion substantially midway between the sides thereof capable of receiving the tongue, forming the outer end of the strip into wood penetrating elements, forming longitudinally extending rib adjacent one side of the first end portion, forming a longitudinally extending rib on the second end portion adjacent the same side of the strip as the first mentioned rib, the ribs being in parallel relationship and lying on opposite sides of and immediately adjacent to a common longitudinally extending line, the ribs protruding from opposite faces of the strip for subsequent engagement with each other, transversely scoring the strip along the line of juncture between the tongue and first end portion whereby the tongue can be severed from the first end portion by pivotally moving the end portions relative to one another about the weak joint, forming the first end portion into a first channel whereby its rib is located on the side wall of the channel and forming the second end portion into a second channel which is slightly narrower than the first named channel whereby the second channel can be telescopically seated in the first channel and enclosed thereby, and whereby the second named rib is located on the side wall of the second channel corresponding to the side wall of the first channel upon which its rib is located, the first named rib being closer to the side edge of the strip than the second named rib whereby the first named rib lies below and engages the second named rib when the channels are in the telescoped relationship.

Kisovec, U.S. Pat. No. 3,124,223 describes an adjustable framework member consisting of at least two longitudinally extended parts including an outer carrier having a lower edge, an upper edge and side walls which connect the lower edge and the upper edge, and inner carrier telescopically received in said outer carrier with vertical clearance between the two carriers, adjustable locking means disposed inwardly of the end of the outer carrier for displacing the inner end of the inner carrier upwardly with respect to the outer carrier, and inwardly projecting fulcrum means located below the lower surface of the upper edge of the outer carrier at a point which lies outwardly of the locking means.

Rambelje, U.S. Pat. No. 3,196,996 describes a form supporting girder comprising an end support piece disposed at the ends thereof and having a load supporting support flange extending longitudinally from the end at the uppermost point thereof, the invention comprising a bearing rib transversely arranged at the mid-portion of the end face of said piece, the rib extending outwardly from the face a distance approximating the room necessary for pinch bar insertion and having an enlarged end portion, a bearing ridge downwardly extending from the bottom of the flange and having a bearing face aligned with the enlarged end portion of the bearing rib.

Rambelje, U.S. Pat. No. 3,247,639 describes and adjustable cambered form-supporting girder for concrete construction comprising a box-like section and an I-beam section sidable lengthwise within the box-like section for adjustment of the length of the girder, locking means for holding an outer end surface of the I-beam section pressed against an inner surface of the box-like section, the box-like section being constructed of a single extruded member having opposed side walls and upper and lower walls extending between the side walls, and at least one flange extending lengthwise of the box-like section and projecting upwardly above the upper wall, the upwardly projecting flange being higher toward the center of the box-like section than toward the ends thereof to produce a camber in the uppermost surface of the box-like section without cambering such section as a whole.

Bigalow, U.S. Pat. No. 3,282,001 describes a vertical column and a base supporting the column, the base comprising a flat stationary plate, a cover having an opening, means fixing the cover to the plate in spaced relation there above, and a flat adjustable plate supported on the stationary plate in the space between it and the cover, the column being fixed to the adjustable plate and extending through the opening, the opening being larger than the cross-sectional dimensions of the column to enable adjustment of the adjustable plate with respect to the stationary plate to rotate the column and shift it horizontally in any direction, but smaller than the adjustable plate, whereby the cover retains the adjustable plate, the column remaining vertical throughout adjustments of the adjustable plate.

Demeules et al., U.S. Pat. No. 3,325,957 describes an extensible joist comprising in combination: a main joist assembly composed of a pair of longitudinally extended laterally spaced elongated members, each elongated member having an outwardly directed flange and a downwardly directed flange, a brace means including an elongated element having alternate upward and downward right angle bends, the elongated element having alternate right angle bends located between and secured to the downwardly directed flanges to divide the element into plurality of segments, a longitudinally extended stress member positioned below the members and secured to the brace means, and end piece having a generally U-shaped configuration mounted on one end of the joist assembly for longitudinal sliding movement thereon, the end piece comprising a pair of end piece members positioned adjacent the outside of one end of the downwardly directed flange of the elongated member at the outer end thereof and a cross member connecting the outer ends of the end piece members, each end piece member having an elongated top surface engageable with the bottom surface of the adjacent outwardly directed flange of the elongated member and a side engageable with the outside of the adjacent downwardly directed flange, the end piece members including opposed and aligned longitudinally extended openings, and adjustable and releasable fastening means extended through the openings between adjacent segments of said brace means releaseably clamping the sides of the end piece members into engagement with the downwardly directed flanges, a single retaining means connected to the elongated members longitudinally inwardly from the one end of the joist assembly and extended downwardly therefrom between the end piece members, the retaining means having a portion engaging the bottom of the end piece members and holding the top surfaces of the end piece members in engagement with the bottom surfaces of the downwardly directed flanges Bolton, U.S. Pat. No. 3,648,425 describe a device including threadably engaged telescoping members adapted to be extended into engagement with spaced apart nonmetallic floor joists. One end of the device has two pointed projections for penetrating a joist and limiting the member from rotating while the other end has a single pointed projection for penetrating a joist but permitting the member to be rotated to extend the device.

McDonnell, U.S. Pat. No. 3,897,668 describes a spring-loaded, adjustable stud, for a wall partition arrangement, adapted to fit between a pair of channel members secured to a floor and ceiling, comprising; a pair of channel elements arranged in telescoping relation, and having spring means interconnecting said channel elements and urging them away from each other and against said channel members.

Mieyal, U.S. Pat. No. 4,397,127 describes a metal stud assembly disclosing for use in either drywall construction or as intermediate studs in demountable walls. The stud assembly includes a U-shaped stud member and a U-shaped stud extension which telescopes into one end of the stud member with a resilient-type of interference fit which produces a controlled resistance to relative axial movement and eliminates possible looseness. The stud extension is provided with angulated tabs which snap into a channel-shaped ceiling track to lock the stud extension therein. The lower end of the stud fits into a channel-shaped floor track to secure the lower end of the stud assembly in place. The stud assembly is sufficiently flexible to allow the lower end to be twisted through about 90 degree to position the narrow dimension thereof crosswise with respect to the floor track for easy insertion. After insertion, the stud assembly is returned to the untwisted position to complete the installation.

Frigon, U.S. Pat. No. 5,228,251 describes An extendable pole or mast is constructed from a plurality of nested pole sections with each pole section is made from an initially flat sheet which is roll formed into a rectangular, preferably square, cross section element. A seam is formed by over lapping the edges of the sheet, with the bulk of the seam being placed inwardly of the element. Each of the inner sections includes its own seam and an offset of sufficient size and depth to receive the seam and offset of outer sections. The sheet material permits tabs to be cut or stamped into outer walls of the outer sections in order to support an adjacent inner pole section. Tabs are formed in each of the outer pole sections. These tabs are biased to extend inwardly, against the adjacent inner pole section. Tabs may be formed below the first tab to provide a choice in the amount of extension of the pole.

Muller et al., EP 0625622, describes an extensible structural support having an inner tube which is plugged telescopically into an outer tube and is provided in the longitudinal direction with a plurality of bores for receiving a plug-in bolt which is intended for the length adjustment of the structural support and, in the event of loading of the structural support, is supported on the outer tube. According to the invention, adjacent bores of the inner tube are arranged such that they are offset, in the circumferential direction of the inner tube, by a predetermined angular amount in each case. By virtue of the bores being arranged such that they are offset at certain angles, the invention makes it possible, for a structural support with a predetermined nominal load-bearing capacity and with a spacing between adjacent bores of the inner tube which is the same as in the prior art, to reduce the wall thickness and/or the diameter of the inner tube considerably, as a result of which savings in materials and thus weight can be made for the structural support, this having considerable advantages in terms of costs, in particular as far as the mass production of such structural supports is concerned.

The prior art teaches the use of various struts, girders and other metal framing elements in the construction of buildings, but fails to teach a tool as defined herein that is functional in the preparation of the ends of square tubes so as to enable improvements in the joining of such ends in constructing building frames.

SUMMARY OF THE INVENTION

The present invention teaches certain benefits in construction and use which give rise to the objectives described below.

The present invention is a tool and its use in preparing the ends of square tubes used as framing struts. The tool receives a tube end axially wherein four cutting edges sever the tube at its four corners. Two opposing curved surfaces force two opposing sides of the tubing to rollup inside the tube, while two alternate curved surfaces force the alternate opposing sides to jog outwardly into slots, or alternately, to move laterally. In the first case, the resultant tube end provides opposing sides spaced apart for receiving a second tube of the same size wherein the alternate sides may be fastened to the second tube sidewall while the rolled-up ends provide great rigidity. In the second case, the lateral portions allow for simple fastening of the tube to a wall surface.

A primary objective of the present invention is to provide an adjustable metal framing device in commercial and residential construction having advantages not taught by the prior art.

Another objective is to provide an instant-fitting, permanent framing brace eliminating the necessity of cutting, welding or bolting together with brackets pieces of wood or metal; saving time, materials and eliminating sizing mistakes.

A still further objective is to provide such an invention capable of being easily adaptable to a broad application of construction framing situations, as well as inexpensively mass produced in various metal gauges and in variable fabrication methods.

Other features and advantages of the present invention will become apparent from the following, more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1 is a perspective view of a first embodiment of the present tool invention and a sheet metal tube shown in position prior to a tube end forming operation using a method of the present invention;

FIG. 2 is similar to FIG. 1 showing the engagement of the tube with the tool to form the preferred end of the tube;

FIG. 8 is a perspective view of a second embodiment of the present tool invention and a sheet metal tube shown in position prior to a further tube end forming operation using a method of the present invention;

FIG. 9 is similar to FIG. 8 showing the engagement of the tube with the tool to form a further preferred end of the tube;

DETAILED DESCRIPTION OF THE INVENTION

Figure 3:
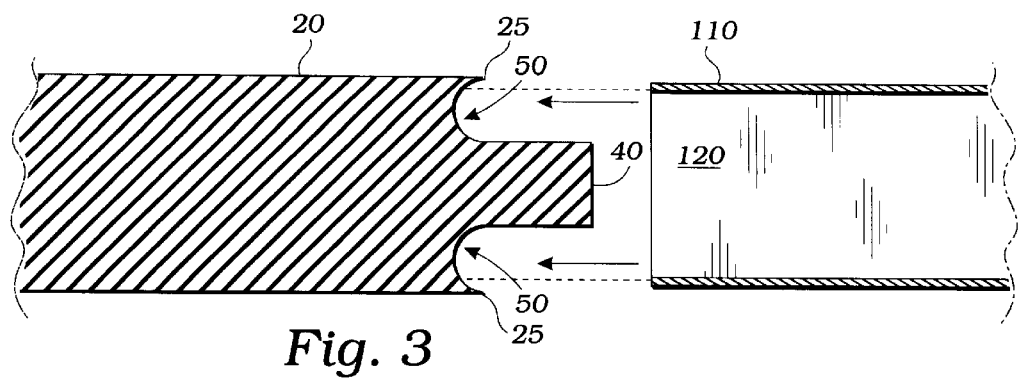
FIGS. 3 and 4 are sectional views thereof taken along lines 3—3 and 4—4 of FIGS. 1 and 2 respectively.
Figure 4:
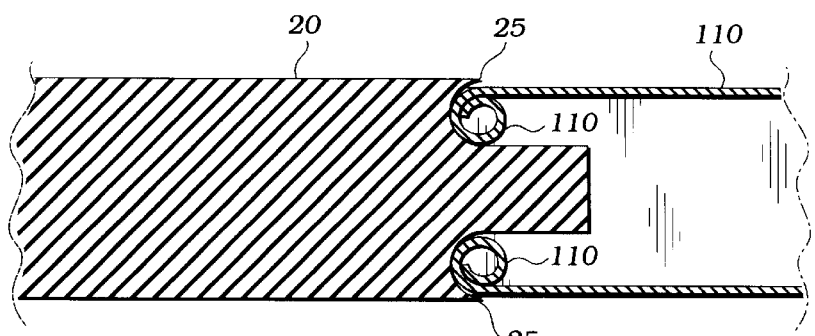

The above described drawing FIGS. 1–7 illustrate the invention, a tubular sheet metal cutting and forming tool apparatus and method of use.

A tubular sheet metal cutting and forming tool apparatus comprises: a rectangular rigid body 10 made of hardened and sharpened tool steel and formed from a solid rectangular block of such tool steel, the rigid body defining a first pair of opposing side surfaces 20 as seen in FIG. 1, and at right angles thereto, a second pair of opposing side surfaces 30. Surfaces 20 and 30 define a square or a right-rectangular cross section. The rectangular body 10 terminates with a rectangular nose portion 40 extending axially from an end of the body 10. The rectangular nose portion 40 provides a pair of spaced apart curved surfaces 50 respectively joining the first pair of opposing side surfaces 20 at edges 25. A pair of spaced apart planar surfaces 60 on the nose portion 40 join, and are contiguous with the second pair of opposing side surfaces 30 through opposing respective sloped ridges 70. Each of the curved surfaces 50 provides a pair of spaced apart cutting edges 80, adapted with a keen edge for shearing a workpiece, a square or rectangular sheet metal tube 90, at its side wall intersections 100 which are the corners of the tube 90. The workpiece is not a part of the apparatus or the invention, but is the object of the inventive method of use of the apparatus tool 10. A first opposing severed tube side wall ends 110 of the tube 90 are rolled on the spaced apart curved surfaces 50 as the tube 90 is moved into cutting contact (see arrows in FIG. 1) with the apparatus 10, while the second opposing severed tube side wall ends 120 are forced to jog outwardly by the sloped ridges 70.

Figure 5:
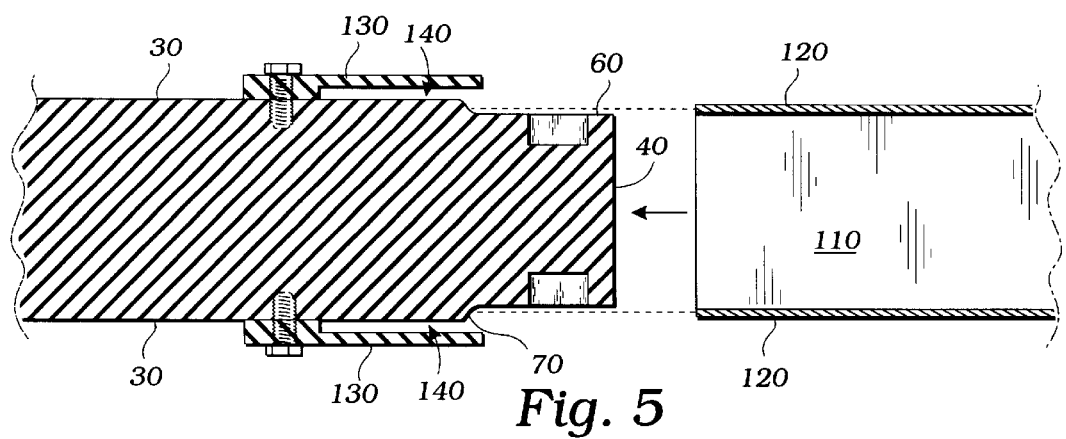
FIGS. 5 and 6 are sectional views thereof taken along lines 5—5 and 6—6 of FIGS. 1 and 2 respectively.
Figure 6:
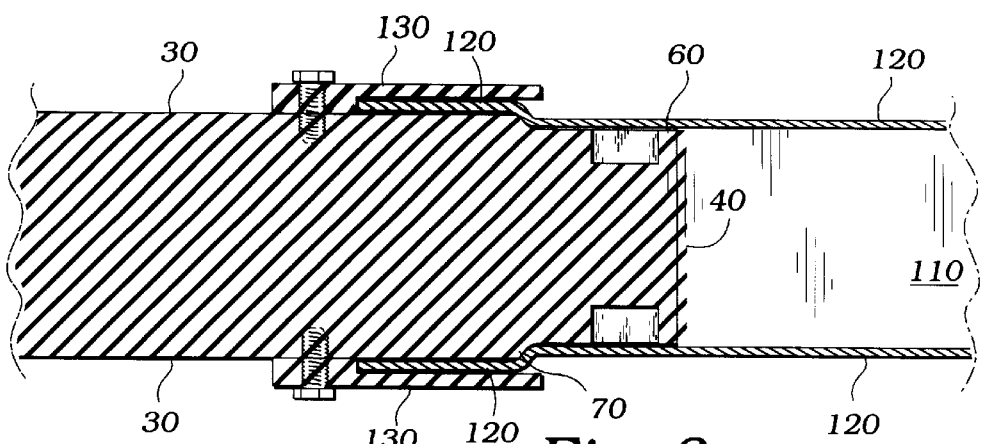
Figure 7:
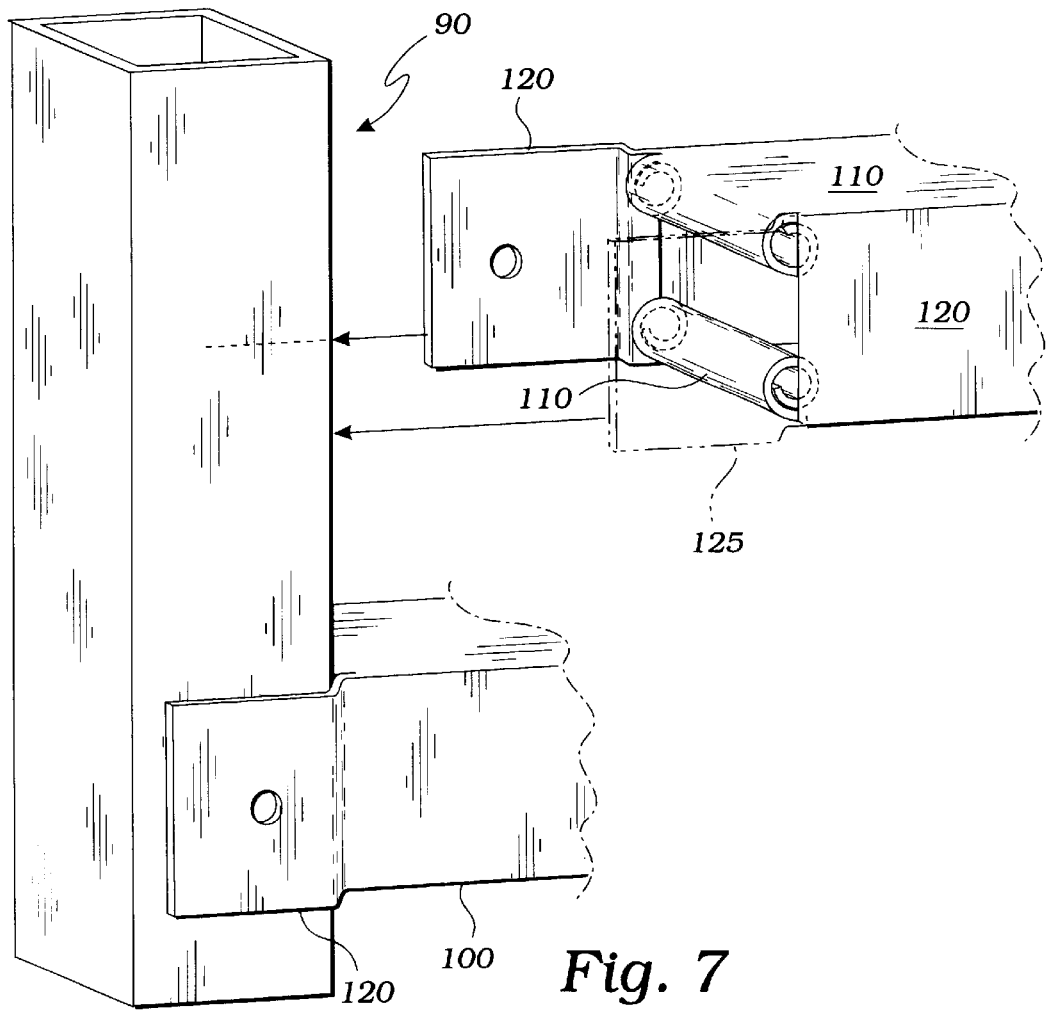
FIG. 7 is a perspective view thereof showing the use of the prepared end of the sheet metal tube with a tube of similar size in joining the tubes together.
Figure 10:
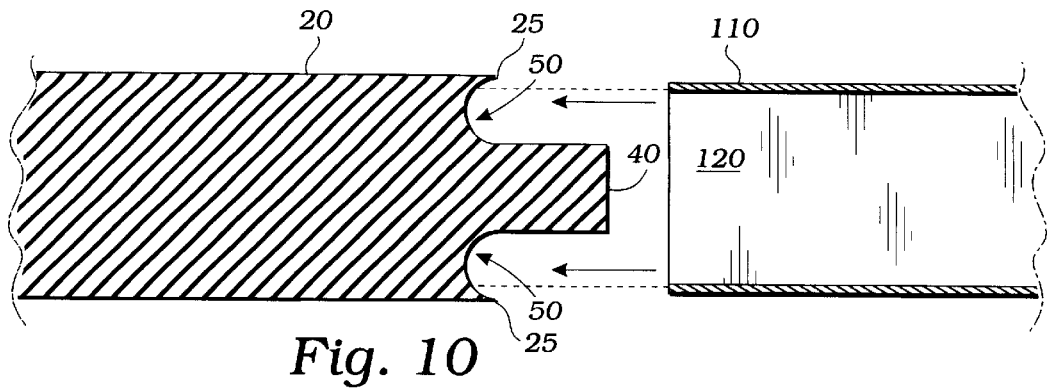
FIGS. 10 and 11 are sectional views thereof taken along lines 10—10 and 11—11 of FIGS. 8 and 9 respectively.
Figure 11:
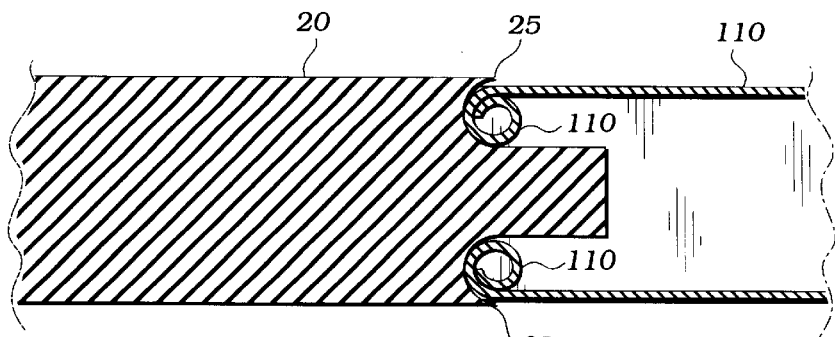
Figure 12:
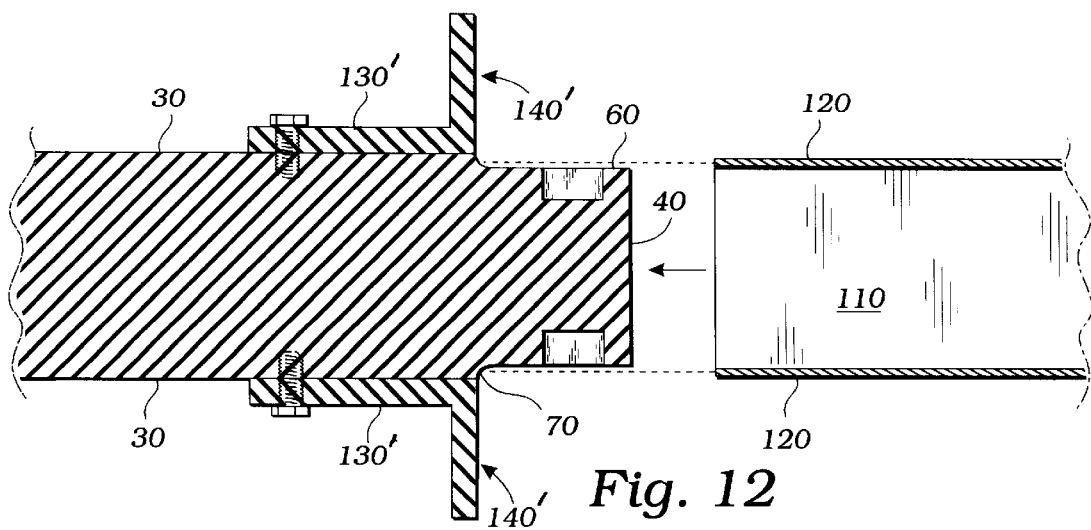
FIGS. 12 and 13 are sectional views thereof taken along lines 12—12 and 13—13 of FIGS. 8 and 9 respectively.
Figure 13:
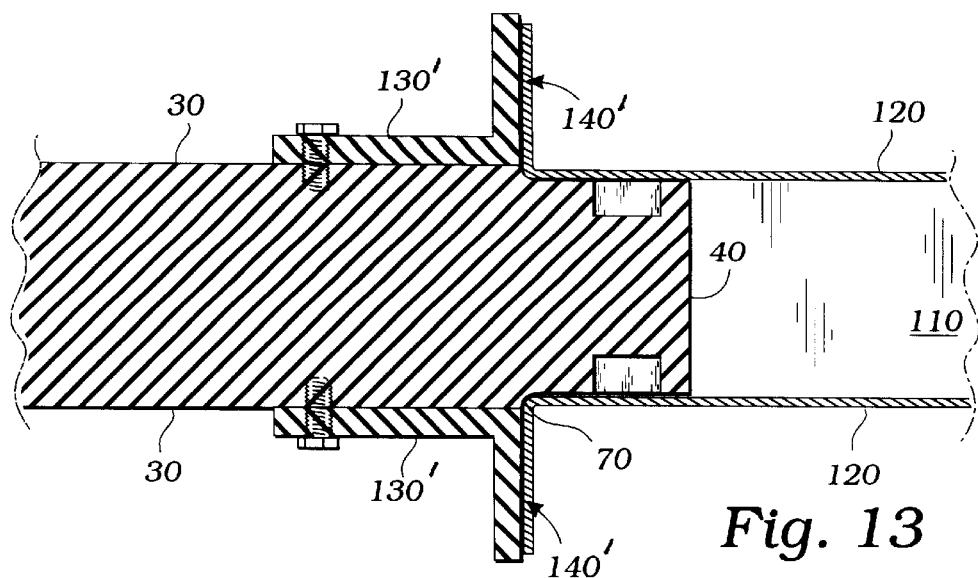
Figure 14:
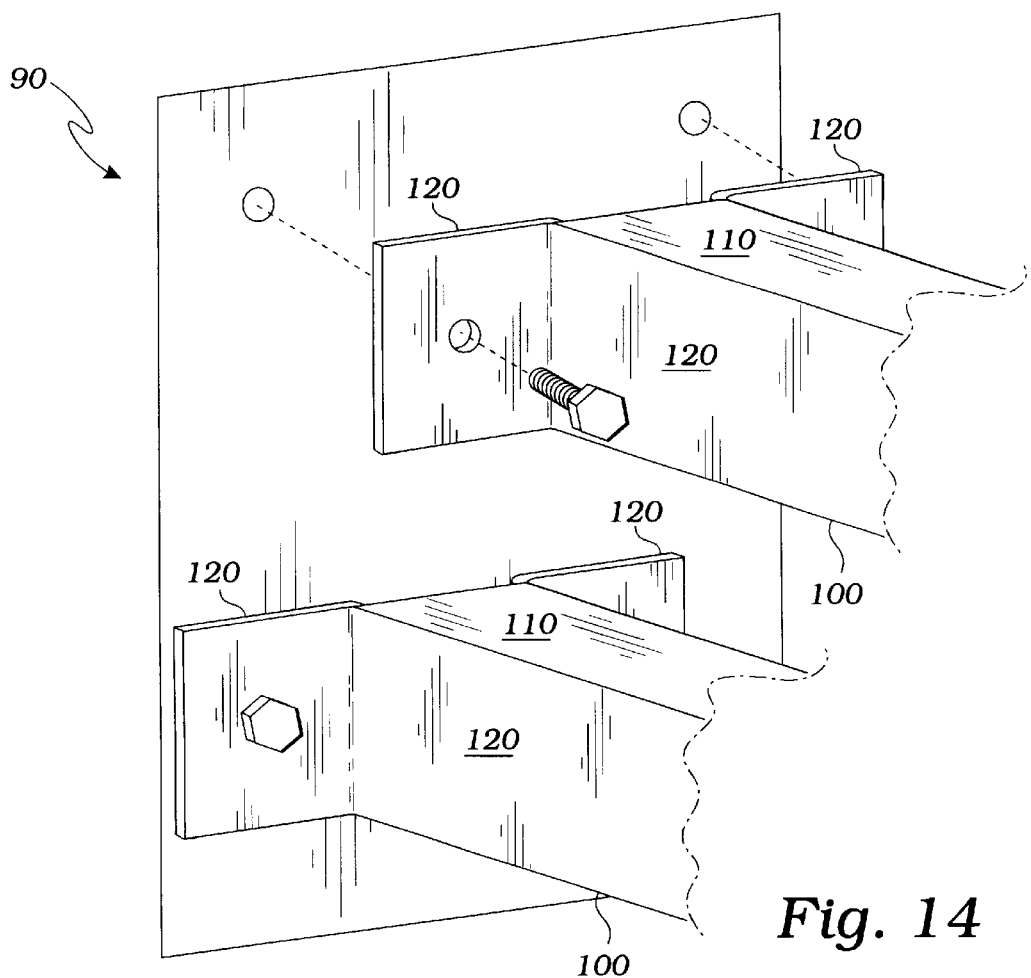
FIG. 14 is a perspective view thereof showing the use of the further prepared end of the sheet metal tube with a wall or similar surface for mounting thereon.
Figure 15:
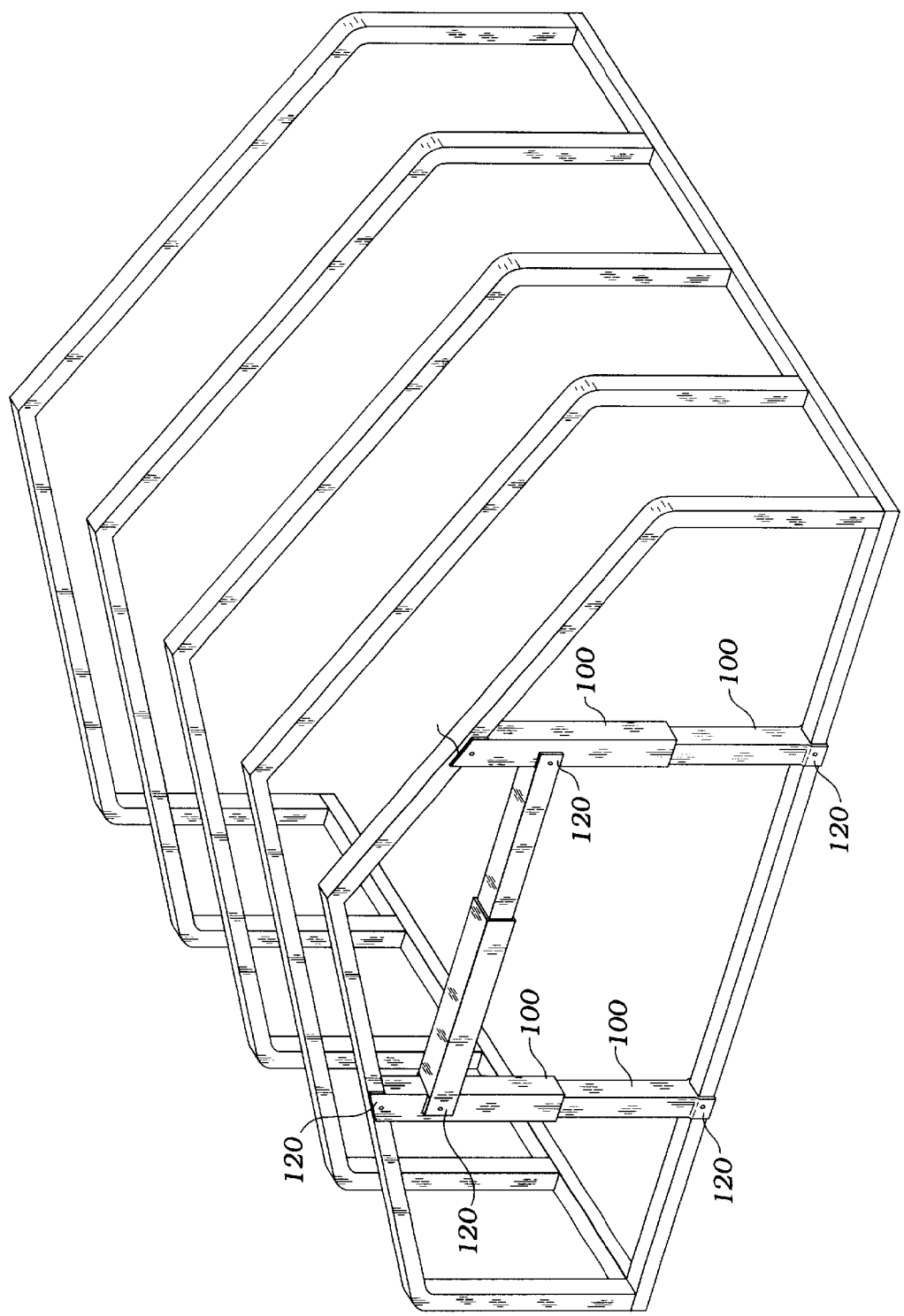
FIG. 15 is a perspective view defining use of the tubes of the invention in building construction.

In the embodiment shown in FIGS. 1–7, opposing arms 130 are engaged with the second pair of opposing side surfaces 30 by bolts or other attachment means, respectively establishing a slot 140 between each one of the second side surfaces 30 and a respective one of the arms 130 as best shown in FIG. 5. The slots 130 direct the jogged outwardly side wall ends 120 into an abutting relationship with the second side surfaces 30 as seen in FIG. 2.

In the embodiment shown in FIGS. 8–14, opposing arms 130' are engaged with the second pair of opposing side surfaces 30 by bolts, etc., establishing laterally positioned surfaces 140' directing the jogged outwardly side walls 120 into laterally opposing positions.

The method of use of the tubular sheet metal cutting and forming apparatus 10 comprises: providing the rectangular rigid body 10 defining the first pair of opposing side surfaces 20, and at right angles thereto, the second pair of opposing side surfaces 30; terminating the rectangular body 10, at one end thereof, with the rectangular nose portion 40 extending axially therefrom; providing the rectangular nose portion 40 with the pair of spaced apart curved surfaces 50 respectively joining the first pair of opposing side surfaces 20, and the pair of spaced apart planar surfaces 60 joining the second pair of opposing side surfaces 30 through opposing respective sloped ridges 70; providing each of the curved surfaces 50 with the pair of spaced apart cutting edges 80; moving the right-rectangular tube 90 axially into the cutting edges 80 at side wall intersections 100 thereof; severing the side wall intersections 100 on the cutting edges 80; rolling the first pair of opposing severed tube side wall ends 110 on the spaced apart curved surfaces 50; and forcing the second pair of opposing severed tube side wall ends 120 to jog outwardly on the sloped ridges 70.

In the first embodiment, the method further comprises the step of engaging opposing arms 130 with the second pair of opposing side surfaces 30 respectively so as to establish the slot 140 between each one of the second side surfaces 30 and the respective one of the arms 130, and directing the jogged outwardly side wall ends 120 into the slots 140 to form the abutting relationship between the side wall ends 120 and the second side wall surfaces 30.

In the second embodiment, the method further comprises-engaging opposing arms 130' with the second pair of opposing side surfaces 30 so as to establish laterally positioned surfaces 140', and directing the jogged outwardly side walls 120 onto the laterally positioned surfaces 140' to form these side walls 120 in laterally opposing positions.

It is clear from the foregoing that the rolled side walls may be rolled in positions inside of the cylinder, as shown, and may, with a modification of the tool, be rolled into positions outside the cylinder. Also, the rolling may be on one side of the cylinder only rather than on both sides. In such a single side rolling, the intact three sides of the tube may be used to for a partial enclosure for a second tube attached thereto where the two tubes are engaged at an angle, for instance.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tubular sheet metal cutting and forming tool apparatus comprising: a rectangular rigid body defining a first pair of opposing side surfaces, and at right angles thereto, a second pair of opposing side surfaces; the rectangular body terminating with a rectangular nose portion extending axially therefrom; the rectangular nose portion providing a pair of spaced apart curved surfaces respectively joining the first pair of opposing side surfaces, and a pair of spaced apart planar surfaces joining the second pair of opposing side surfaces through opposing respective sloped ridges; each of the curved surfaces providing a pair of spaced apart cutting edges for shearing a rectangular tube at side wall intersections thereof so that first opposing severed tube side walls may be rolled on the spaced apart curved surfaces, and so that second opposing severed tube side walls may be forced to jog outwardly on the sloped ridges.

2. The apparatus of claim 1 further comprising opposing arms engaged with the second pair of opposing side surfaces respectively establishing a slot between each one of the second side surfaces and a respective one of the arms, the slots directing the jogged outwardly side walls in abutting relationship with the second side wall surfaces.

3. The apparatus of claim 1 further comprising opposing arms engaged with the second pair of opposing side surfaces respectively establishing laterally positioned surfaces directing the jogged outwardly side walls into laterally opposing positions.

4. A method of tubular sheet metal cutting and forming comprising: providing a rectangular rigid body defining a first pair of opposing side surfaces, and at right angles thereto, a second pair of opposing side surfaces; terminating the rectangular body with a rectangular nose portion extending axially therefrom; providing the rectangular nose portion with a pair of spaced apart curved surfaces respectively joining the first pair of opposing side surfaces, and a pair of spaced apart planar surfaces joining the second pair of opposing side surfaces through opposing respective sloped ridges; providing each of the curved surfaces with a pair of spaced apart cutting edges; moving a rectangular tube axially into the cutting edges at side wall intersections thereof; severing the side wall intersections on the cutting edges; rolling first opposing severed tube side walls on the spaced apart curved surfaces; and forcing second opposing severed tube side walls to jog outwardly on the sloped ridges.

5. The method of claim 4 further comprising engaging opposing arms with the second pair of opposing side surfaces respectively so as to establish a slot between each one of the second side surfaces and a respective one of the arms, and directing the jogged outwardly side walls into the slots to form an abutting relationship between the jogged outwardly severed tube side walls and the second side wall surfaces.

6. The method of claim 4 further comprising engaging opposing arms with the second pair of opposing side surfaces respectively so as to establish laterally positioned surfaces, and directing the jogged outwardly side walls onto the laterally positioned surfaces to form laterally opposing positions.

* * * * *